(12) United States Patent
Mantell et al.

(10) Patent No.: US 9,663,304 B2
(45) Date of Patent: May 30, 2017

(54) ROTARY CHUCK

(71) Applicant: Greenlee Textron Inc., Rockford, IL (US)

(72) Inventors: Ryan Mantell, Woodstock, IL (US); Jeffrey Plummer, Rockford, IL (US); Gerald Tully, Elgin, IL (US); Sean Daugherty, Gilberts, IL (US)

(73) Assignee: GREENLEE TEXTRON INC., Rockford, IL (US)

( * ) Notice: Subject to any disclaimer, the term of this patent is extended or adjusted under 35 U.S.C. 154(b) by 464 days.

(21) Appl. No.: 14/081,262

(22) Filed: Nov. 15, 2013

(65) Prior Publication Data

US 2015/0139774 A1  May 21, 2015

(51) Int. Cl.
| | |
|---|---|
| *B65G 47/24* | (2006.01) |
| *B23B 31/28* | (2006.01) |
| *B23B 31/34* | (2006.01) |
| *B23B 31/12* | (2006.01) |
| *B21D 7/16* | (2006.01) |

(52) U.S. Cl.
CPC .............. *B65G 47/24* (2013.01); *B21D 7/16* (2013.01); *B23B 31/1261* (2013.01); *B23B 31/28* (2013.01); *B23B 31/34* (2013.01); *Y10T 279/13* (2015.01)

(58) Field of Classification Search
CPC ..... B23B 31/1261; B23B 31/21; B23B 31/34; B65G 47/24; B21D 7/16; Y10T 279/13
USPC ...... 414/816; 294/116; 279/2.02, 2.04, 2.03, 279/2.19, 2.24, 5; 29/243; 269/57, 77, 269/909
See application file for complete search history.

(56) References Cited

U.S. PATENT DOCUMENTS

| | | | | |
|---|---|---|---|---|
| 1,833,601 A | * | 11/1931 | Batterman | ................ B23B 3/04 192/47 |
| 2,362,071 A | * | 11/1944 | Hunziker | .......... B23B 31/16091 279/5 |
| 2,490,597 A | * | 12/1949 | Niederhiser | ............ B23B 31/28 279/110 |
| 3,880,437 A | * | 4/1975 | Scharfen | .......... B23B 31/16287 279/5 |

(Continued)

OTHER PUBLICATIONS

"youtube/uYc_r5igaWQ" ( "YLM-1"); Ahmet Ozer; Mar. 31, 2013; screen shot of video at 1:10/11:11.*

(Continued)

*Primary Examiner* — Michael McCullough
*Assistant Examiner* — Lynn Schwenning
(74) *Attorney, Agent, or Firm* — Klintworth & Rozenblat IP LLC

(57) ABSTRACT

A rotary chuck includes a clamp assembly, a first drive mechanism for operating the clamp assembly to clamp an associated workpiece, a frame rotationally fixed to the clamp assembly, and a second drive mechanism for rotating the frame and the clamp assembly. The second drive mechanism can rotate the frame and the clamp assembly around 360 degrees. A pair of alignment springs are engaged with a mounting plate upon which the second drive mechanism is mounted. The mounting plate can pivot relative to a stable surface to which it is mounted, and the springs limit the pivotal movement. Each first and second drive mechanism includes a motor, and are connected to a microprocessor for operation of the respective motor.

19 Claims, 6 Drawing Sheets

(56) References Cited

U.S. PATENT DOCUMENTS

| | | | |
|---|---|---|---|
| 4,624,466 A | 11/1986 | Steinberger | |
| 5,322,399 A * | 6/1994 | Felbush | B23B 5/16 269/909 |
| 6,152,435 A | 11/2000 | Snell | |
| 6,757,576 B2 | 6/2004 | Greer et al. | |
| 7,305,274 B2 | 12/2007 | Greer et al. | |
| 7,806,393 B2 * | 10/2010 | Hara | B25B 5/087 269/228 |
| 2003/0080267 A1 | 5/2003 | Eslick | |
| 2008/0107490 A1 | 5/2008 | Hughes | |
| 2010/0130106 A1 | 5/2010 | Hyatt et al. | |
| 2011/0100160 A1 | 5/2011 | Petrescu et al. | |
| 2012/0243954 A1 | 9/2012 | Rusch | |
| 2012/0328406 A1 * | 12/2012 | Shock | B21D 37/14 414/758 |
| 2014/0056680 A1 * | 2/2014 | Lind | B42C 99/00 414/754 |

OTHER PUBLICATIONS

"youtube/uYc_r5igaWQ" ( "YLM-2"); Ahmet Ozer; Mar. 31, 2013; screen shot of video at 1:15/11:11.*
"youtube/uYc_r5igaWQ" ( "YLM-3"); Ahmet Ozer; Mar. 31, 2013; screen shot of video at 1:21/11:11.*
"youtube/uYc_r5igaWQ" ( "YLM-4"); Ahmet Ozer; Mar. 31, 2013; screen shot of video at 8:20/11:11.*
"youtube/uYc_r5igaWQ" ( "YLM-5"); Ahmet Ozer; Mar. 31, 2013; screen shot of video at 8:32/11:11.*
"youtube/pOcqZQAmMgu" ("Tubotron-1"); Tracto-Technik GmbH & Co KG; Jul. 26, 2011; screen shot of video at 2:22/3:12.*
"youtube/pOcqZQAmMgu" ("Tubotron-2"); Tracto-Technik GmbH & Co KG; Jul. 26, 2011; screen shot of video at 2:15/3:12.*
"youtube/pOcqZQAmMgu" ("Tubotron-3"); Tracto-Technik GmbH & Co KG; Jul. 26, 2011; screen shot of video at 2:59/3:12.*
"youtube/pOcqZQAmMgu" ("Tubotron-4"); Tracto-Technik GmbH & Co KG; Jul. 26, 2011; screen shot of video at 0:07/3:12.*
http://www.startechnologysrl.it/eng/software.html, 3 pages.
http://metal.baileighindustrial.com/metalworking/mandrel-benders, 3 pages.
http://metal.baileighindustrial.com/mandrel-tubebender-mb-80-cnc, 2 pages.
http://metal.baileighindustrial.com/mb-nce1, 2 pages.
http://metal.baileighindustrial.com/mandrelbenders-mb-nch-2-series, 2 pages.
http://www.blmgroup.com/en/products/bending.aspx, 2 pages.
http://www.blmgroup.com/en/products/bending/tube/elect-xl.aspx, 1 page.
http://www.hornmachinetools.com/, 3 pages.
http://www.addisonmckee.com/benders, 2 pages.
http://www.eatonleonard.com/mainpages/cnc-tube-bending-machines.html, 1 page.
http://youtu.be/ayPD5s4uiXM, uploaded by BillaVista on Sep. 29, 2009.
http://youtu.be/5SFs4O64RIE, uploaded by JaimeeJD2 on Feb. 14, 2011.
http://youtu.be/yigRgG_NlyU, uploaded by COONEYMARINE1's channel on Jun. 22, 2010.
http://youtu.be/vglQqs1f6XM, uploaded by GRBInnovations's channel on Mar. 9, 2012.
http://youtu.be/uYc_r5igaWQ, uploaded by Ahmet Ozer on Mar. 31, 2013.
http://youtu.be/pOcqZQAmMgU, uploaded by Tracto-Technik GmbH & Co. KG on Jul. 26, 2011.
http://youtu.be/Mrbs-17rfxw, uploaded by BaileighIndustrial on Dec. 22, 2011.
http://youtu.be/O2VilX74X0o, uploaded by GTMPOWER on Aug. 2, 2013.
Instructional Manual for 854 Quad Bender, 2007 Greenlee Textron Inc., 25 pages.
International Search Report and Written Opinion for PCT/US2014/065637 dated Feb. 25, 2015, 14 pages.

* cited by examiner

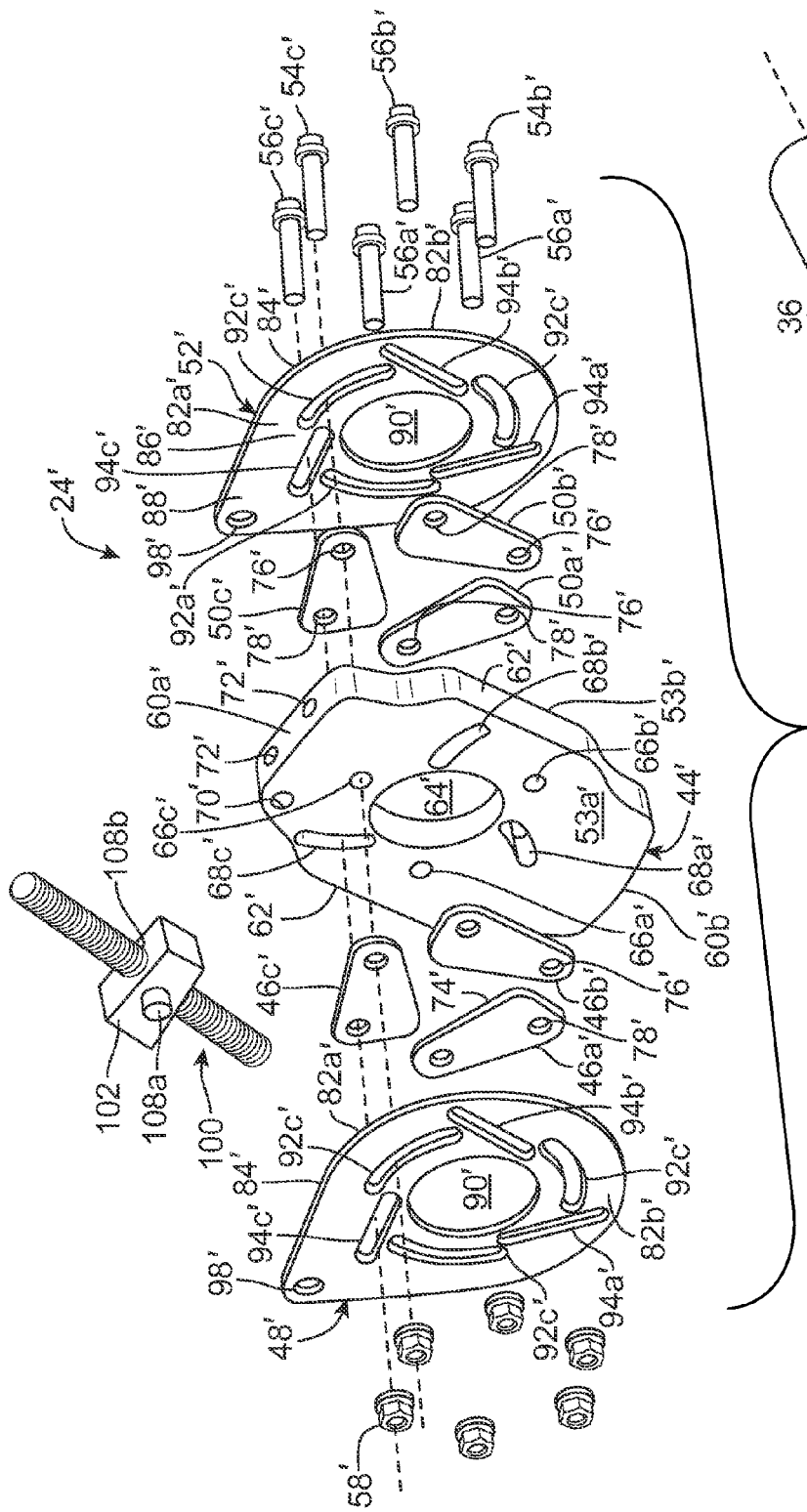
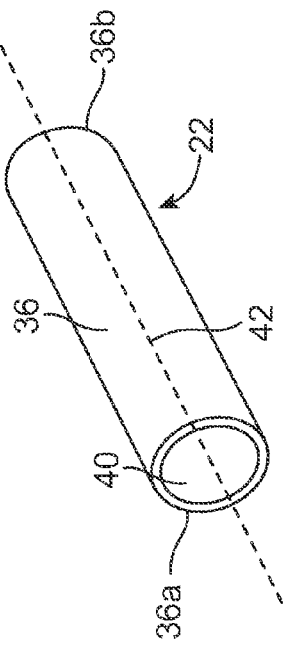
FIG. 8
FIG. 9

ROTARY CHUCK

FIELD OF THE INVENTION

The present invention relates to a rotary chuck that is used to clamp a workpiece, such as a tube, pipe or conduit, and rotate the workpiece so that the workpiece can be properly positioned for a bending operation.

BACKGROUND OF THE INVENTION

There are several prior methods of clamping and rotating tubing, pipe and conduit. A first method is that the user manually installs the proper size mandrel or collets to secure the tubing, pipe or conduit which is then manually fed into the bending machine. The user must also manually rotate for alternative bends on the same piece of tubing, pipe or conduit. Another method is that the user manually installs the proper size mandrel or collets to secure the tubing, pipe or conduit which is then automatically fed into the bending machine. All prior methods consisted of either having no rotation of the workpiece, manual rotation of the workpiece or the workpiece was automatically rotated using motors, geared motors, or a form of hydraulic or pneumatic actuation.

U.S. Pat. No. 6,152,435 discloses a multi-diameter vise clamp and collet jaw that allows for the machining of top surfaces and ends of a held part. The collet jaws are secured to each of the clamping blocks on the machine vise. The collet jaws include at least one collet pocket shaped into the inside surface of each collet jaw. The collet pockets are designed to receive collet pads which are shaped to hold a generally cylindrical part with varying diameters. By having more than one collet pocket within each collet jaw, several different sizes of collet pads can be utilized at the same time and a part with varying diameters can be held securely in place within the machine vise.

United States Publication No. US 2003/0080267 A1 discloses a multi-sized clamp capable of attaching to various sized cylindrical objects such as iris rods of a professional movie camera. The multi-sized clamp includes a pair of clamp jaws connected by a hinge and a pivotable adjustment rod. The clamp jaws' interior surfaces include curved surfaces having at least two different diameters. The clamp jaws are opened by turning the pivotable adjustment rod in one direction and closed by turning it in the opposite direction. One of the clamp jaws also contains a body that also has an opening and an L-shaped split above the opening with a closing mechanism running through the body above the opening and through the split. The closing mechanism when turned in one direction increases the opening and decreases the opening when turned in the opposite direction, thus allowing other equipment to be attached to the clamp through the opening.

United States Publication No. 2012/0243954 A1 discloses a hole saw tube notcher with a rotary vice that aligns a tubular workpiece and a hole saw aligning assembly with a rotatable arm that aligns a hole saw to form a single or multiple cut notch geometry with a set radial middle that remains fixed when the rotary arm is rotated and when different diameter workpieces and hole saws are secured to the notcher.

Current tube, pipe and conduit benders have collets and mandrels that have to be changed whenever a new diameter (inner diameter or outer diameter) tube, pipe or conduit is used. This becomes very costly to obtain and store numerous sizes of collets and mandrels.

A rotary chuck is provided herein which provides improvements to existing chucks and which overcomes the disadvantages presented by the prior art. Other features and advantages will become apparent upon a reading of the attached specification, in combination with a study of the drawings.

SUMMARY OF THE INVENTION

A rotary chuck includes a clamp assembly, a first drive mechanism for operating the clamp assembly to clamp an associated workpiece, a frame rotationally fixed to the clamp assembly, and a second drive mechanism for rotating the frame, the first drive mechanism and the clamp assembly. The second drive mechanism can rotate the frame, the first drive mechanism and the clamp assembly around 360 degrees. A pair of alignment springs are engaged between the second drive mechanism and a stable surface. The mounting plate can pivot relative to the stable surface, and the springs limit the pivotal movement. The first and second drive mechanisms include a motor, and are connected to a microprocessor for operation of the respective motors.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is an exploded perspective view of components of an alternative version of the rotary chuck; and FIG. 9 is a perspective view of a workpiece using with the rotary chuck.

DETAILED DESCRIPTION OF THE ILLUSTRATED EMBODIMENTS

Figure 1:
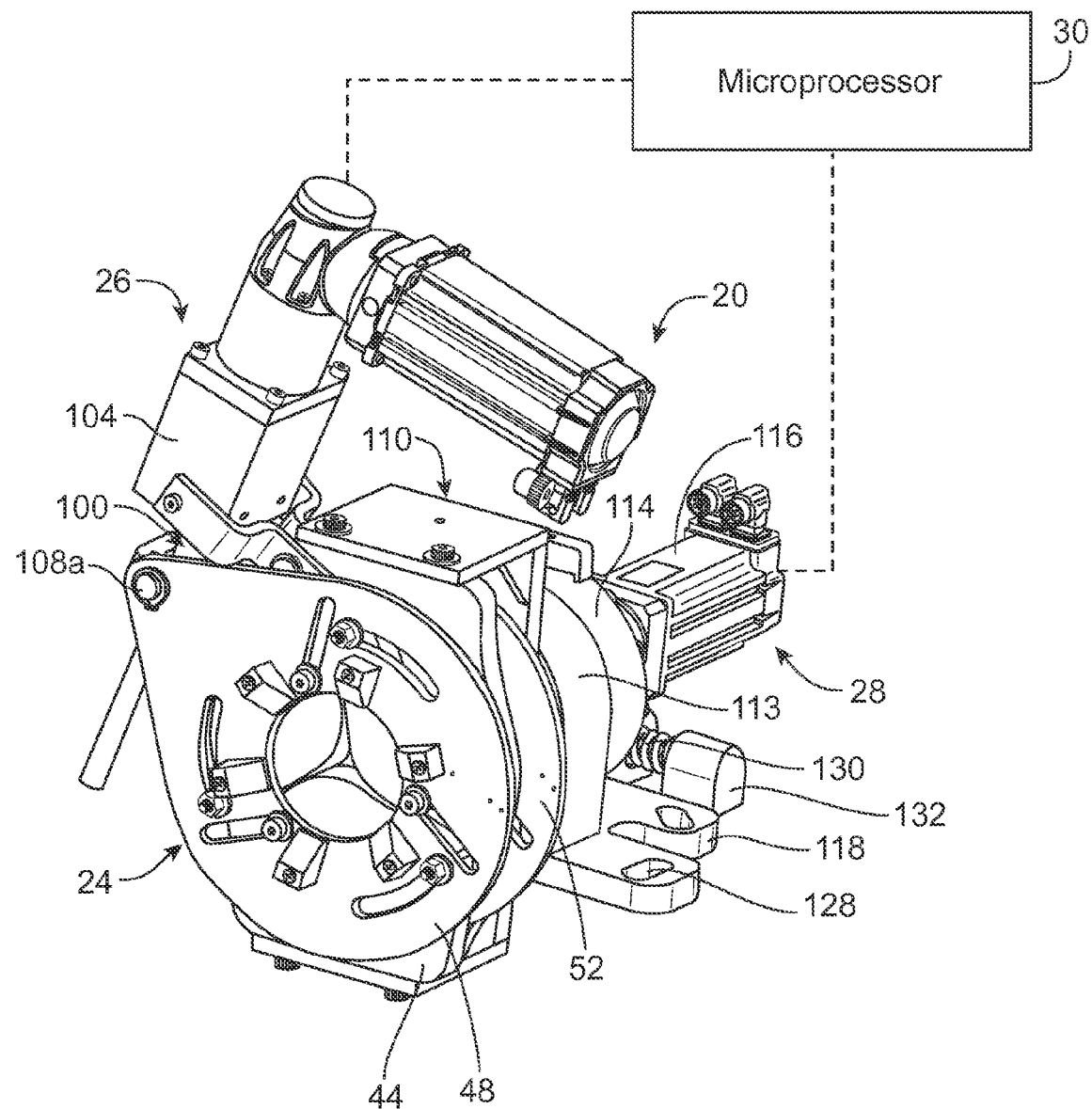
FIG. 1 is a perspective view of a rotary chuck which incorporates the features of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A rotary chuck 20 is used to hold a workpiece 22, such as commercial grade tube, pipe or conduit, so that a bend can be formed in the workpiece 22 by an associated bending machine (not shown), and is further used to rotate the workpiece 22 so that additional bend(s) can be formed in the workpiece 22 by the associated bending machine without having to disengage the workpiece 22 from the rotary chuck 20. The rotary chuck 20 solves the issue of having to manually change collets or mandrels because the rotary chuck 20 enables the user to securely clamp the workpiece 22 and rotate the workpiece 22 into a desired position. The rotary chuck 20 includes a clamp assembly 24, 24', a drive mechanism 26 for operating the clamp assembly 24, a rotary assembly 28 for rotating the clamp assembly 24, 24' and its drive mechanism 29, and a microprocessor 30 for operation of the rotary chuck 20. A first embodiment of the clamp assembly 24 is shown in FIGS. 1-6. A second alternate embodiment of the clamp assembly 24' includes a typical iris/diaphragm chuck similar to that shown in United States Publication No. US 2012/0243954 A1, which disclosure is herein incorporated by reference in its entirety.

The workpiece 22, see FIG. 9, may be any typical workpiece 22, having an outer diameter between 0.5" and 7", which is to be bent into a defined shape having one or more bends in the workpiece 22. The workpiece 22 has opposite ends 36a, 36b which defines a length therebetween, and a sidewall 36 which can have a central passageway 40 therethrough. The workpiece 22 has a longitudinal axis or centerline 42. The sidewall 38 may take a variety of cross-sectional shapes, such as for example, but not limited to, circular, rectangular, square, hexagonal. The workpiece 22 is preferably made of metal, but could be another solid bendable material. While the workpiece 22 is generally shown and described herein as being a tube, pipe or conduit, it should be understood that the workpiece 22 could take other forms and shapes, such as a solid rod.

Figure 7:
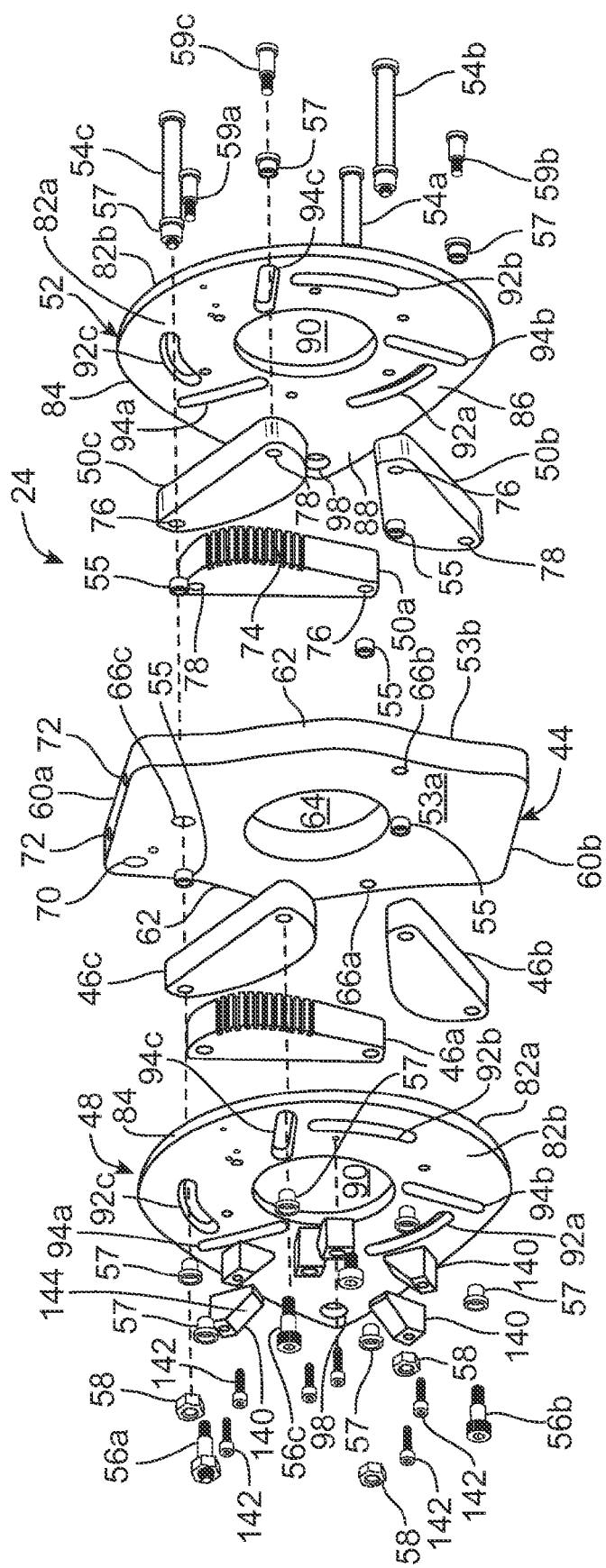
FIG. 7 is an exploded perspective view of components of the rotary chuck.

As best shown in FIG. 7, the clamp assembly 24 includes a stationary base plate 44, a first set of serrated jaws 46a, 46b, 46c sandwiched between the base plate 44 and a first actuator plate 48, a second set of serrated jaws 50a, 50b, 50c sandwiched between the base plate 44 and a second actuator plate 52, and a set of pivot fasteners 54a, 54b, 54c and their associated spacers 55, 57 and their associated lock nuts 58, a first set of drive fasteners 56a, 56b, 56c and their associated spacers 57, and a second set of drive fasteners 59a, 59b, 59c and their associated spacers 57. The pivot fasteners 54a, 54b, 54c may be formed of bolts. The drive fasteners 56a, 56b, 56c, 59a, 59b, 59c have threaded ends and may be formed of bolts.

The set of pivot fasteners 54a, 54b, 54c and their associated lock nuts 58 connect the actuator plate 52 to the jaws 50a, 50b, 50c to the base plate 44 to the jaws 46a, 46b, 46c to the actuator plate 48. The first set of drive fasteners 56a, 56b, 56c and their associated spacers 57 connect the actuator plate 48 to the jaws 46a, 46b, 46c. The second set of drive fasteners 59a, 59b, 59c and their associated spacers 57 connect the actuator plate 52 to the jaws 50a, 50b, 50c.

The base plate 44 has opposite flat side surfaces 53a, 53b having an upper edge 60a, a lower edge 60b, and opposite side edges 62. Each upper and lower edge 60a, 60b is generally planar. The base plate 44 has a central circular opening 64 around which are three uniformly spaced pivot holes 66a, 66b, 66c, each of which pass completely through the base plate 44. Each pivot hole is preferably 120° from its adjacent pivot holes. Each pivot hole 66a, 66b, 66c is located the same radial distance from the center of the circular opening 64. A securement hole 70 is located toward a top side corner of the base plate 44. A first set of mounting openings 72 are provided in the upper edge 60a of the base plate 44 for attachment to the rotary assembly 28 as described herein, and a second set of mounting openings (not shown) are provided in the lower edge 60b of the base plate 44 for attachment to the rotary assembly 28 as described herein.

The first and second actuator plates 48, 52 are mirror images of the other. Each actuator plate 48, 52 has opposite flat side surfaces 82a, 82b and has an outer edge 84 which generally defines a teardrop-shape having a main body portion 86 and an extended portion 88. The main body portion 86 of each actuator plate 48, 52 has a generally central circular opening 90 around which are three uniformly spaced arced rotation slots 92a, 92b, 92c and three uniformly spaced linear drive slots 94a, 94b, 94c are provided. The start end of each arced rotation slot 92a, 92b, 92c is 120° from the start end of its adjacent arced rotation slots 92a, 92b, 92c, and the start end of each linear drive slot 94a, 94b, 94c is 120° from the start end of its adjacent linear drive slots 94a, 94b, 94c. Each arced rotation slot 92a, 92b, 92c is arced about the center of the opening 90. Each arced rotation slot 92a, 92b, 92c has a corresponding linear drive slot 94a, 94b, 94c. Each arced rotation slot 92a, 92b, 92c is located the same radial distance from the center of the circular opening 90, and each linear drive slot 94a, 94b, 94c is located the same radial distance from the center of the circular opening 90. Each linear drive slot 94a, 94b, 94c extends in a somewhat radial manner from the center of the opening 90. The extended portion 88 has a drive hole 98 extending therethrough for attachment to the first drive mechanism 26.

The first set of jaws 46a, 46b, 46c are proximate to the first side surface 53a of the base plate 44 and proximate to side surface 82a of actuator plate 48. The second set of jaws 50a, 50b, 50c are proximate to the second side surface 53b of the base plate 44 and proximate to side surface 82a of actuator plate 50.

Each jaw 46a, 46b, 46c, 50a, 50b, 50c is uniformly shaped and is hardened to prevent deformation of the jaw 46a, 46b, 46c, 50a, 50b, 50c. Each jaw 46a, 46b, 46c, 50a, 50b, 50c has a workpiece engaging surface 74 which is formed by a plurality of teeth to form serrations thereon, a first pivot hole 76 and a second pivot hole 78 provided therethrough. The serrations are parallel to an axis defined through a center of the openings 90 in the actuator plates 48, 52. The second pivot hole 78 have an internal thread. The jaws 46a, 46b, 46c, 50a, 50b, 50c are uniformly spaced both rotationally around the openings 64, 90 and radially from the centers of the openings 64, 90 so that the workpiece engaging surface 74 of the jaws 46a, 46b, 46c, 50a, 50b, 50c form a working centerline 133 that passes through the center of the openings 64, 90.

Each pivot fastener 54a, 54b, 54c passes through a spacer 57 mounted in the respective rotation slot 92a, 92b, 92c in actuator plate 52, a corresponding jaw pivot hole 76 in jaws 50a, 50b, 50c, a pair of spacers 55 mounted in the respective pivot hole 66a, 66b, 66c of the base plate 44 (one spacer 55 is mounted into side surface 53b and another spacer 55 is mounted into side surface 53a), a corresponding jaw pivot hole 76 in jaws 46a, 46b, 46c, and a spacer 57 mounted in the respective rotation slot 92a, 92b, 92c in actuator plate 48. The jaws 46a, 46b, 46c, 50a, 50b, 50c abut against the spacers 57 to provide a space between the jaws 46a, 46b, 46c, 50a, 50b, 50c and the base plate 44. Each drive fastener 56a, 56b, 56c passes through a spacer 57 mounted in the respective linear slot 94a, 94b, 94c in actuator plate 48 and into a corresponding jaw pivot hole 78 in jaws 46a, 46b, 46c. The jaws 46a, 46b, 46c abut against the spacers 57 to provide a space between the jaws 46a, 46b, 46c and the actuator plate 48. The pivot hole 78 in jaws 46a, 46b, 46c are internally threaded to engage the threaded end of the drive fastener 56a, 56b, 56c to mate the actuator plate 48 and the jaws 46a, 46b, 46c together. Each drive fastener 59a, 59b, 59c passes through a spacer 57 mounted in the respective linear slot 94a, 94b, 94c in actuator plate 52 and into a corresponding jaw pivot hole 78 in jaws 50a, 50b, 50c. The jaws 50a, 50b, 50c abut against the spacers 57 to provide a space between the jaws 50a, 50b, 50c and the actuator plate 52. The pivot holes 78 in jaws 50a, 50b, 50c are internally threaded to engage the threaded end of the drive fastener 59a, 59b, 59c to mate the actuator plate 52 and the jaws 50a, 50b, 50c together. A lock nut 58 is secured to the ends of the pivot fasteners 54a, 54b, 54c and hold the jaws 46a, 46b, 46c, 50a, 50b, 50c, base plate 44 and actuator plates 48, 52 together, while allowing rotating movement of the actuator plates 48, 52 with respect to the base plate 44 and the jaws 46a, 46b, 46c, 50a, 50b, 50c. The actuator plates 48, 52 are aligned in registry with each other and with the circular opening 64 so that the centerline 133 of openings 90 and 64 form a common centerline that is co-linear with the working centerline of the jaws 46a, 46b, 46c, 50a, 50b, 50c.

An alternate clamp assembly 24' is shown in FIG. 8. The clamp assembly 24' includes a stationary base plate 44', a first set of serrated jaws 46a', 46b', 46c' sandwiched between the base plate 44' and a first actuator plate 48', a second set of serrated jaws 50a', 50b', 50c' sandwiched between the base plate 44' and a second actuator plate 52', and a set of pivot fasteners 54a', 54b', 54c', drive fasteners 56a', 56b', 56c', and lock nuts 58' for connecting the base plate 44', the jaws 46a', 46b', 46c', 50a', 50b', 50c' and the actuator plates 48', 52' together. The fasteners 54a', 54b', 54c', 56a', 56b', 56c' may be formed of bolts.

The base plate 44' has opposite flat side surfaces 53a', 53b' having an upper edge 60a', a lower edge 60b', and opposite side edges 62'. Each upper and lower edge 60a', 60b' is generally planar. The base plate 44' has a central circular opening 64' around which are three uniformly spaced pivot holes 66a', 66b', 66c' and three uniformly spaced rotation slots 68a', 68b', 68c', each of which pass completely through the base plate 44'. Each pivot hole is preferably 120° from its adjacent pivot holes, and each rotation slot is preferably 120° from its adjacent rotation slots. Each pivot hole 66a', 66b', 66c' has a corresponding rotation slot 68a', 68b', 68c' that is radially arced about its respective pivot hole 66a', 66b', 66c'. Each pivot hole 66a', 66b', 66c' is located the same radial distance from the center of the circular opening 64', and each rotation slot 68a', 68b', 68c' is located the same radial distance from the center of the circular opening 64'. Each rotation slot 68a', 68b', 68c' extends in a generally radial manner from the center of the opening 64'. A securement hole 70' is located toward a top side corner of the base plate 44'. A first set of mounting openings 72' are provided in the upper edge 60a' of the base plate 44' for attachment to the rotary assembly 28 as described herein, and a second set of mounting openings (not shown) are provided in the lower edge 60b' of the base plate 44' for attachment to the rotary assembly 28 as described herein.

The first and second actuator plates 48', 52' are mirror images of the other. Each actuator plate 48', 52' has opposite flat side surfaces 82a', 82b' and has an outer edge 84' which generally defines a teardrop-shape having a main body portion 86' and an extended portion 88'. The main body portion 86' of each actuator plate 48', 52' has a generally central circular opening 90' around which are three uniformly spaced arced rotation slots 92a', 92b', 92c' and three uniformly spaced linear drive slots 94a', 94b', 94c' are provided. The start end of each arced rotation slot 92a', 92b', 92c' is 120° from the start end of its adjacent arced rotation slots 92a', 92b', 92c', and the start end of each linear drive slot 94a', 94b', 94c' is 120° from the start end of its adjacent linear drive slots 94a', 94b', 94c'. Each arced rotation slot 92a', 92b', 92c' is arced about the center of the opening 90'.

Each arced rotation slot 92a', 92b', 92c' has a corresponding linear drive slot 94a', 94b', 94c'. Each arced rotation slot 92a', 92b', 92c' is located the same radial distance from the center of the circular opening 90', and each linear drive slot 94a', 94b', 94c' is located the same radial distance from the center of the circular opening 90'. Each linear drive slot 94a', 94b', 94c' extends in a somewhat radial manner from the center of the opening 90'. The extended portion 88' has a drive hole 98' extending therethrough for attachment to the first drive mechanism 26.

The first set of jaws 46a', 46b', 46c' are located on the first side surface 53a' of the base plate 44', and the second set of jaws 50a', 50b', 50c' are located on the second side surface 53b' of the base plate 44'. The jaws 46a', 46b', 46c' seat flush against side surface 82a' of actuator plate 48'. The jaws 50a', 50b', 50c' seat flush against side surface 82a' of actuator plate 52'.

Each jaw 46a', 46b', 46c', 50a', 50b', 50c' is uniformly shaped. Each jaw 46a', 46b', 46c', 50a', 50b', 50c' has a workpiece engaging surface 74' which is formed by a plurality of teeth to form serrations thereon, a first pivot hole 76' and a second pivot hole 78' provided therethrough. The jaws 46a', 46b', 46c', 50a', 50b', 50c' are uniformly spaced both rotationally around the openings 64', 90' and radially from the centers of the openings 64', 90' so that the workpiece engaging surface 74' of the jaws 46a', 46b', 46c', 50a', 50b', 50c' form a working centerline that passes through the center of the openings 64', 90'.

Each pivot fastener 54a', 54b', 54c' passes through the respective rotation slot 92a', 92b', 92c' in actuator plate 52', a corresponding jaw pivot hole 76' in jaws 50a', 50b', 50c', the respective pivot hole 66a', 66b', 66c' of the base plate 44', a corresponding jaw pivot hole 76' in jaws 46a', 46b', 46c', and the respective rotation slot 92a', 92b', 92c' in actuator plate 48'. Each drive fastener 56a', 56b', 56c' passes through the respective linear slot 94a', 94b', 94c' in actuator plate 52', a corresponding jaw pivot hole 78' in jaws 50a', 50b', 50c', the respective rotation slot 68a', 68b', 68c' of the base plate 44', a corresponding jaw pivot hole 78' in jaws 46a', 46b', 46c', and the respective linear slot 94a', 94b', 94c' in actuator plate 48'. A lock nut 58' is secured to the ends of the fasteners 54a', 54b', 54c', 56a', 56b', 56c' and hold the jaws 46a', 46b', 46c', 50a', 50b', 50c', base plate 44' and actuator plates 48', 52' together, while allowing rotating movement of the actuator plates 48', 52' with respect to the base plate 44' and the jaws 46a', 46b', 46c', 50a', 50b', 50c'. The actuator plates 48', 52' are aligned in registry with each other and with the circular opening 64' so that the centers of openings 90' and 64' form a common centerline that is co-linear with the working centerline of the jaws 46a', 46b', 46c', 50a', 50b', 50c'.

As can be seen from the description above, two differences between clamp assembly 24 and clamp assembly 24' are that the slots 68a', 68b', 68c' are eliminated in clamp assembly 24, and two sets of drive fasteners 56a, 56b, 56c, 59a, 59b, 59c are provided in clamp assembly 24 instead of a single drive fastener 56a', 56b', 56c' as provided in clamp assembly 24'. The elimination of the slots 68a', 68b', 68c' provides for an ease in manufacturing as the components do not need to be additional lined up through these slots 68a', 68b', 68c'.

Figure 2:
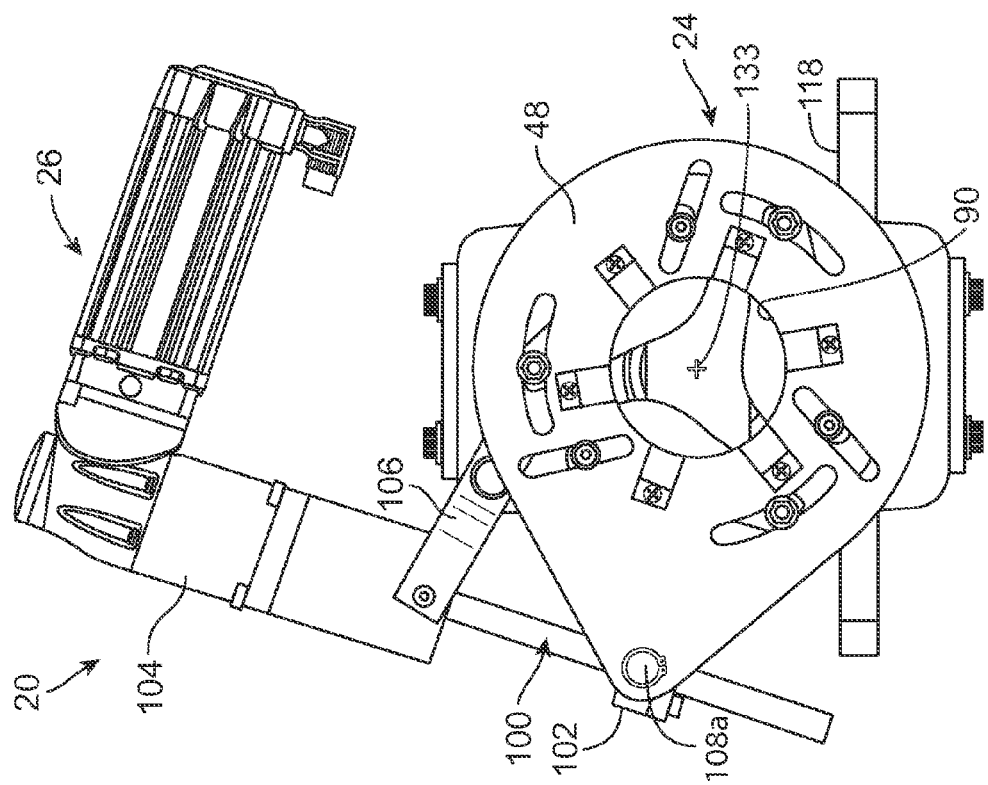
FIG. 2 is a front elevation view of the rotary chuck.
Figure 4:
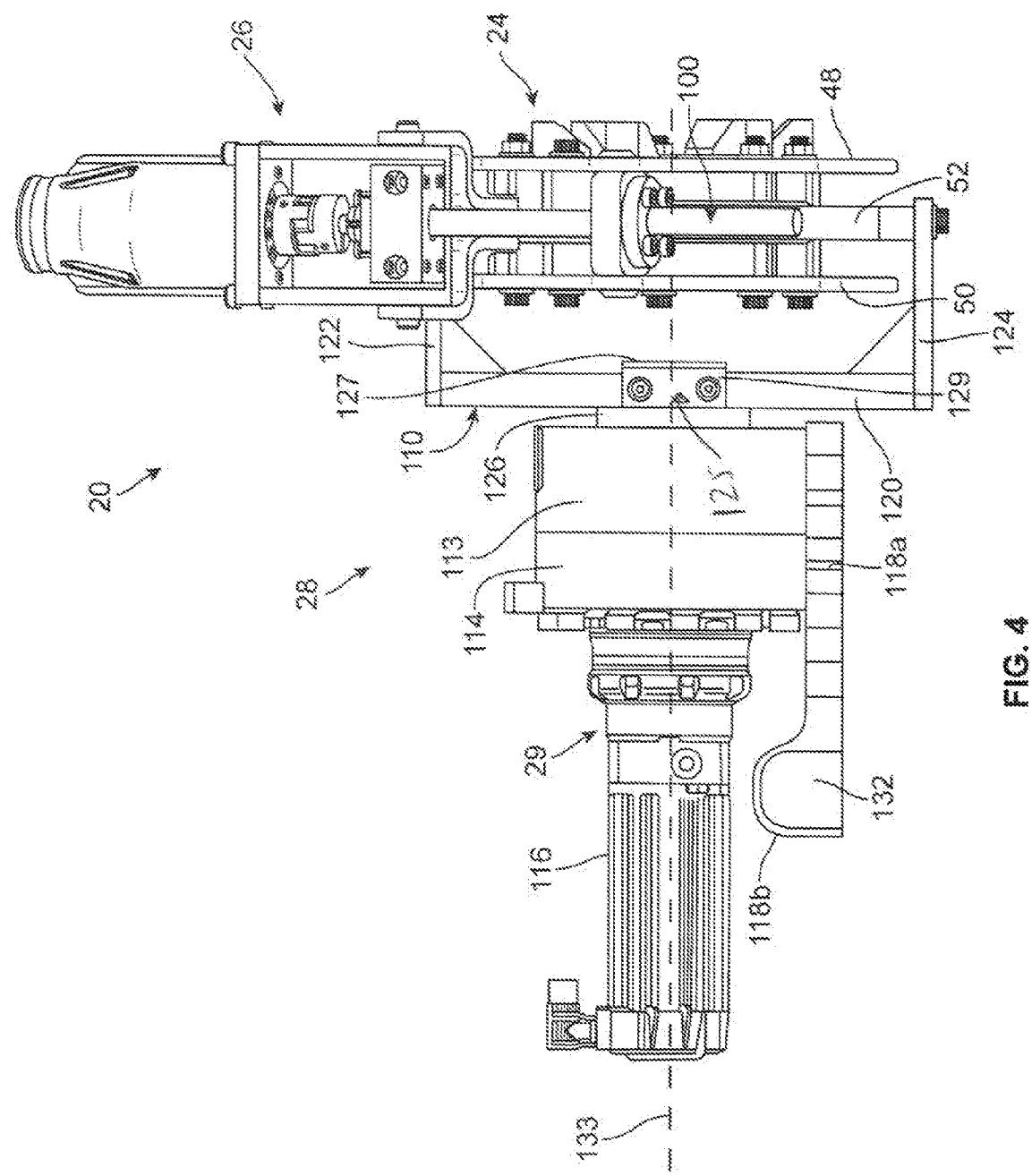
FIG. 4 is side elevation view of the rotary chuck.

The drive mechanism 26, see FIGS. 2 and 8, drives the clamp assembly 24, 24'. The drive mechanism 26 includes a threaded drive rod 100 preferably formed of ¾"-10 ACME screw, a threaded drive coupling 102 for attaching the drive rod 100 to the clamp assembly 24, 24', a motor 104 attached to an end of the drive rod 100, mounting brackets 106 for attaching the motor 104 to the clamp assembly 24, 24'. Suitable motors 104 include, but are not limited to, servo motors, stepper motors and DC motors. The microprocessor 30 is in communication with the motor 104 for controlling the motor 104 and for monitoring the motor 104. The threaded drive coupling 102 is in threaded engagement with the threaded rod 100. The drive coupling 102 includes two opposed protrusions 108*a*, 108*b* that pivotally engage the drive holes 98 of the actuator plates 48, 52, 48', 52' so that the drive coupling 102 does not rotate with the threaded drive rod 100. While the drive mechanism 26 is described as a threaded drive rod 100, threaded drive coupling 102 and motor 104, other drive mechanisms may be provided for operating the clamp assembly 24, 24', such as pneumatic or hydraulic drive assemblies as are known in the art.

The mounting brackets 106 for attaching the motor 104 to the clamp assembly 24, 24' extend between and are attached to the motor 104 and the base plate 44, 44'. This fixes the position of the motor 104 relative to the base plate 44, 44' such that the motor 104 moves when the clamp assembly 24, 24' is rotated as described herein.

The microprocessor 30 monitors and determines the current draw of the motor 104 in a known manner. The microprocessor 30 also monitors and determines the rotation of the motor 104 in a known manner and determines the travel length of the drive rod 100.

The clamp assembly 24, 24' and its associated drive mechanism 26 are mounted to the rotary assembly 28. The rotary assembly 28 includes a frame 110, and its drive mechanism 29 which includes a series of roller bearings 112 mounted in a bearing carrier 113, a rotary gearbox 114, a motor 116 and a mounting plate 118 for the mounting the rotary gearbox 114 and the motor 116. The roller bearings 112 may be tapered bearings, spherical roller bearings, cylindrical roller bearings, radial ball bearings, etc. The microprocessor 30 is in communication with the motor 116 for controlling the motor 116 and for monitoring the motor 116. Suitable motors 116 include, but are not limited to, servo motors, stepper motors and DC motors.

The frame 110 attaches the drive mechanism 29 to the clamp assembly 24, 24'. The frame 110 is generally U-shaped and includes a base plate 120, a first arm 122 extending from an upper end of the base plate 120, and a second arm 124 extending from a lower end of the base plate 120. The first arm 122 is fixedly secured to the planar upper edge 60*a*, 60*a'* of the base plate 44, 44' by suitable means such as fasteners that extend through the arm 122 and into the base plate 44, 44'. The second arm 124 is fixedly secured to the planar lower edge 60*b*, 60*b'* of the base plate 44, 44' by suitable means such as fasteners that extend through the arm 122 and into the base plate 44, 44'. A U-shaped stop plate 125 is attached to the base plate 120 and includes a base plate 127 and arms 129 extending from side edges of the base plate 127. The arms 129 are fixedly secured to the planar side edges of the base plate 127 by suitable means such as fasteners that extend through the arms 129 and into the base plate 127.

A drive shaft 126 extending from the motor 116 is attached to the base plate 120 by suitable means, such as a bracket and fasteners. The stop plate 125 overlaps the end of the drive shaft 126 to protect the drive shaft 126 from damage when the workpiece 22 is inserted into the rotary chuck 20 (the stop plate 125 prevents the workpiece 22 from contacting the drive shaft 126). Thus, when the motor 116 rotates, the frame 110 rotates around centerline 133, which rotates the clamp assembly 24, 24' and its drive mechanism 26. The rotary gearbox 114 allows for 360 degree rotation of the clamp assembly 24, 24' and its associated drive mechanism 26 and the workpiece 22 when mounted therein around centerline 133 relative to the ground. The rotary gearbox 114 has enough torque to rotate a workpiece 22 over 184 pounds in overall weight and that has a 90 degree bend in the middle of the workpiece 22. The gearbox 114 allows for pinpoint accuracy when rotating the workpiece 22. The bearing carrier 113 operates smoothly under harsh conditions. The bearing carrier 113 can withstand the full weight of a 10 foot length of 4 inch rigid conduit hanging from the clamp assembly 24, 24'.

The motor 116 is fixedly mounted on a stable surface 117, such as a stationary or moveable carriage, via the mounting plate 118. The mounting plate 118 is formed of a flat plate having a main body portion 118*a* and an extension portion 118*b* extending from an end of the main body portion 118*a*. The mounting plate 118 is suitably attached to the stable surface 117 such as by fasteners which extend through apertures 128 provided through the main body portion 118*a*. As shown, the apertures 128 are enlarged such that the mounting plate 118 can pivot relative to the ground and relative to the centerline 133, resulting in angular movement of the clamp assembly 24 relative to the centerline 133 and relative to the stable surface 117 as described herein. The bearing carrier 113 and the rotary gearbox 114 mount on the main body portion 118*a* and are affixed thereto such that movement of the mounting plate 118 moves the drive mechanism 29.

Figure 3:
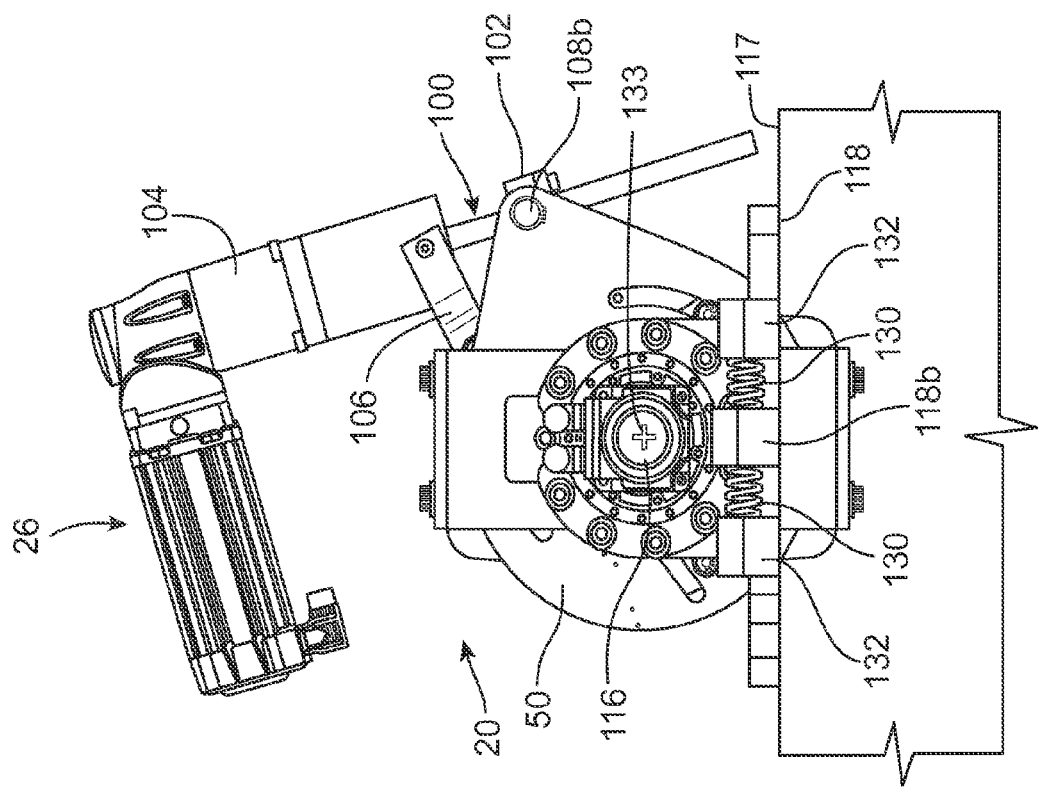
FIG. 3 is a rear elevation view of the rotary chuck.
Figure 5:
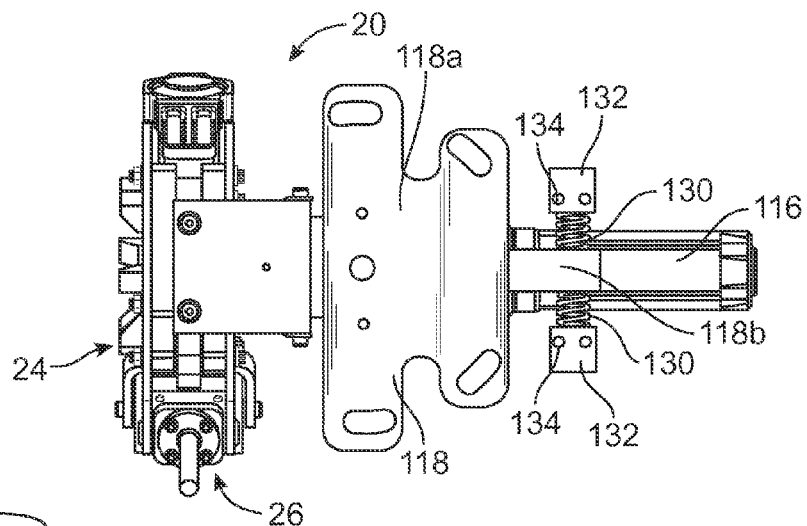
FIG. 5 is a bottom plan view of the rotary chuck.
Figure 6:
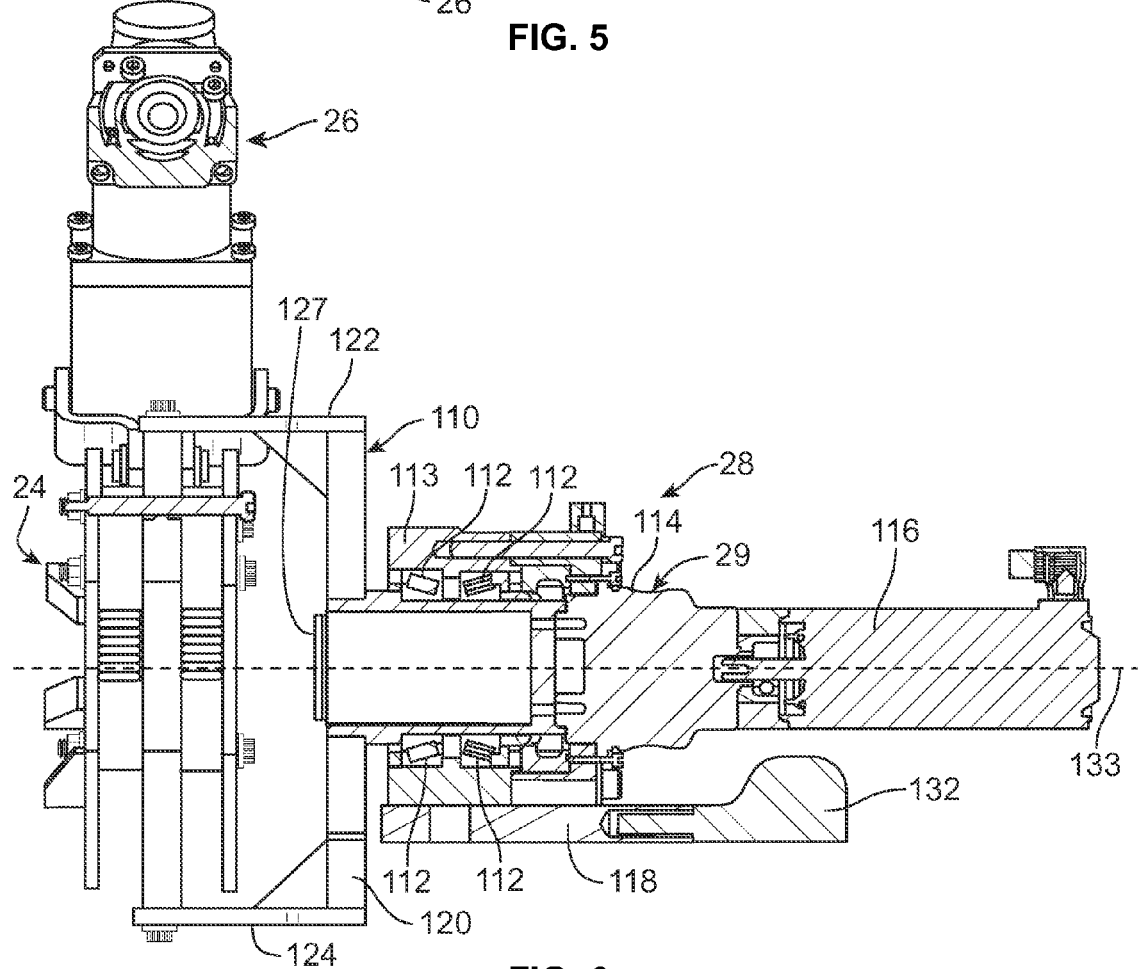
FIG. 6 is a cross-sectional view of the rotary chuck.

A pair of alignment springs 130 and their associated housings 132, best shown in FIGS. 3 and 5, are provided to allow the rotary chuck 20 to pivot a predetermined amount relative to the stable surface 117, preferably 12 degrees, to compensate for inconsistencies in material straightness in the workpiece 22, and to allow for an additional degree of freedom during spring back of the workpiece 22 during the bending process. In addition, once the workpiece 22 is unclamped from the clamp assembly 24, 24' and the clamp assembly 24, 24' is unloaded, the alignment springs 130 self-center the rotary chuck 20 relative to the stable surface 117.

The housings 132 are suitably fixed to the stable surface 117 such as by fasteners which extend through bores 134 provided in the housings 132. An end of each alignment spring 130 seats within the respective housing 132 and the opposite end of each alignment spring 130 abuts against the extension portion 118*b* of the mounting plate 118.

The rotary chuck 20 can pivot relative to the stable surface 117 because of the enlarged apertures 128 in the main body portion 118*a* of the mounting plate 118. The alignment springs 130 limit the amount of pivot and return the rotary chuck 20 to the center position.

In use, the user programs into the microprocessor 30 the size of the workpiece 22 to be clamped. As a result, the microprocessor 30 is programmed to determine the appropriate amount of current draw on the motor 104 and the distance that the drive coupling 102 will travel along the drive rod 100 to achieve the desired clamping force on the workpiece 22.

For clamp assembly 24, rotation of the motor 104 causes drive rod 100 to rotate which moves drive coupling 102 along the drive rod 100, which imparts rotational movement to the actuator plates 48, 52, and inward radial movement of the drive fasteners 56*a*, 56*b*, 56*c*, 59*a*, 59*b*, 59*c* and a corresponding inward pivoting movement of the jaws 46*a*, 46*b*, 46*c*, 50*a*, 50*b*, 50*c*, toward the center of the clamp assembly 24 via the movement of the pivot fasteners 54*a*, 54*b*, 54*c* in their slots 92*a*, 92*b*, 92*c*. This inward pivoting movement of the jaws 46a, 46b, 46c, 50a, 50b, 50c moves them into an aligned gripping engagement with the workpiece 22. The serrations on the workpiece engaging surface 74 may bite into the workpiece 22 to secure the workpiece 22 in the clamp assembly 24, thereby preventing the workpiece 22 from slipping in the jaws 46a, 46b, 46c, 50a, 50b, 50c. When the current draw sensor and the distance sensor indicate that the appropriate clamping force on the workpiece 22 has been achieved, the microprocessor 30 sends a signal to stop actuation of the motor 104. If the incorrect size of the workpiece 22 has been programmed into the microprocessor 30, the microprocessor 30 will be able to determine this because the programmed current draw level and distance travel amount would not be properly reached or will be exceeded. If the microprocessor 30 determines this, the user is notified and asked to verify the size of the workpiece 22. In addition, if the workpiece 22 is galvanized, as the jaws 46a, 46b, 46c, 50a, 50b, 50c, engage with the workpiece 22, the galvanization may wear away and cause the jaws 46a, 46b, 46c, 50a, 50b, 50c, to slip on the surface of the workpiece 22. If this occurs and provided the current and travel limits have not yet been reached, then the rotary chuck 20 is directed by the microprocessor 30 to continue clamping the workpiece 22. The workpiece 22 will re-center in the clamp assembly 24.

For clamp assembly 24', rotation of the motor 104 causes drive rod 100 to rotate which moves drive coupling 102 along the drive rod 100, which imparts rotational movement to the actuator plates 48', 52', and inward radial movement of the drive fasteners 56a', 56b', 56c' and a corresponding inward pivoting movement of the jaws 46a', 46b', 46c', 50a', 50b', 50c', toward the center of the clamp assembly 24' via the movement of the pivot fasteners 54a', 54b', 54c' in their slots 92a', 92b', 92c'. This inward pivoting movement of the jaws 46a', 46b', 46c', 50a', 50b', 50c' moves them into an aligned gripping engagement with the workpiece 22. When the current draw sensor and the distance sensor indicate that the appropriate clamping force on the workpiece 22 has been achieved, the microprocessor 30 sends a signal to stop actuation of the motor 104. If the incorrect size of the workpiece 22 has been programmed into the microprocessor 30, the microprocessor 30 will be able to determine this because the programmed current draw level and distance travel amount would not be properly reached or will be exceeded. If the microprocessor 30 determines this, the user is notified and asked to verify the size of the workpiece 22.

To ensure that the rotary chuck 20 has the required amount of clamping force to rotate the workpiece 22 using the drive mechanism 26, the microprocessor 30 determines the current draw and the distance travel amount from the motor 104. These parameters are monitored by the microprocessor 30 and if at any time the parameters are outside of the requirements for the workpiece 22, the operation will stop. This aids in preventing damage to the rotary chuck 20 as well as to the workpiece 22. For example, if a workpiece 22 having a 4" outer diameter is expected by the program in the microprocessor 30, and a workpiece 22 having a 1" outer diameter is inserted into the rotary chuck 20, when the expected distance travel is met, but the current draw is not met, then the microprocessor 30 is programmed to notify the user that there is an issue. Likewise, if a workpiece 22 having a 1" outer diameter is expected by the program in the microprocessor 30, and a workpiece 22 having a 4" outer diameter is inserted into the rotary chuck 20, when the expected current draw is met, but the distance measurement is not met, then the microprocessor 30 is programmed to notify the user that there is an issue.

The motor 116 is operated by the microprocessor 30 to rotate the frame 110, the clamp assembly 24, 24' and its mounted drive mechanism 26 relative to the stable surface 117 in either direction. The motor 116 can be used to rotate the clamp assembly 24, 24' and its mounted drive mechanism 26 around 360 degrees. This allows the workpiece 22 to be positioned in a variety of rotational positions to allow for infinitely variable bending shapes. This is especially suited for use with a bender that forms a first bend in the workpiece 22, releases the workpiece 22 for repositioning relative to the associated bender and then re-engaging the workpiece 22 to form a second bend.

In the clamp assembly 24, a plurality of mounts 140 are mounted on the flat side surface 82b of actuator plate 48 by fasteners 142. Each mount 140 is formed as a block and has a tapered surface 144 which tapers inwardly toward the opening 90. When a workpiece 22 is inserted into the clamp assembly 24, if the workpiece 22 is off-center, the workpiece 22 will engage the tapered surface(s) 144 of the mount(s) 140 and the tapered surface(s) 144 direct the workpiece 22 into the opening 90.

As a result of the structure of the clamp assembly 24, 24', a large variety of diameters of workpieces 22 can be clamped by the clamp assembly 24, 24' without having to change any parts of the clamp assembly 24, 24'. As discussed above, workpieces 22 used with the clamp assembly 24, 24' may have an outer diameter between 0.5" and 7". This provides for a "zero change-over" in the clamp assembly 24, 24'.

While preferred embodiments of the present invention are shown and described, it is envisioned that those skilled in the art may devise various modifications of the present invention without departing from the spirit and scope of the appended claims.

What is claimed is:

1. A rotary chuck capable of clamping a variety of sizes of workpieces, the rotary chuck comprising:
   a clamp assembly including a plate, a plurality of jaws attached to the plate and movable relative to the plate, the jaws being positionable in a variety of positions relative to the plate to accommodate a variety of sizes of workpieces, the jaws capable of clamping an associated workpiece, the clamp assembly defining a centerline;
   a frame coupled with the plate, the frame and the plate being rotationally fixed relative to each other;
   a first drive mechanism capable of operating the clamp assembly, the first drive mechanism being affixed to the frame;
   a second drive mechanism comprising a motor having a drive shaft, an end of the drive shaft is affixed to the frame, the second drive mechanism rotating the frame, the clamp assembly and the first drive mechanism around the centerline relative to a ground surface; and
   the frame including a stop plate which is aligned with an end of the drive shaft, wherein the stop plate is configured to abut a workpiece and prevent further movement of the workpiece relative to the second drive mechanism.

2. The rotary chuck of claim 1, wherein the first drive mechanism, the clamp assembly and the frame can be rotated around 360 degrees.

3. The rotary chuck of claim 1, further including a mounting plate to which the second drive mechanism is affixed, the mounting plate being pivotally mounted on a stable surface, the mounting plate having at least a pair of elongated apertures therethrough.

4. The rotary chuck of claim 3, further including a pair of springs engaged between the second drive mechanism and a stable surface, the second drive mechanism being capable of pivotal movement on the stable surface, the springs limiting the amount of pivotal movement of the second drive mechanism.

5. The rotary chuck of claim 1, further including a mounting plate to which the second drive mechanism is attached, the mounting plate being pivotally mounted on a stable surface; and a pair of springs between the second drive mechanism and the stable surface, the springs limiting the amount of pivotal movement of the mounting plate.

6. The rotary chuck of claim 1, wherein the first drive mechanism includes a motor, and further comprising a microprocessor operating the motor.

7. The rotary chuck of claim 1, further comprising a microprocessor operating the first and second drive mechanisms.

8. The rotary chuck of claim 1, wherein the first drive mechanism includes a motor, a threaded drive rod connected to the motor, and a threaded drive coupling the drive rod to the clamp assembly.

9. The rotary chuck of claim 8, wherein the motor is coupled with the clamp assembly by brackets.

10. The rotary chuck of claim 1, wherein said clamp assembly is an iris/diaphragm clamp.

11. The rotary chuck of claim 1 in combination with a workpiece.

12. The combination of claim 11, wherein said workpiece has an outer diameter between 0.5" and 7".

13. An assembly comprising:
a stable surface;
a mounting plate having at least a pair of elongated apertures therethrough;
fasteners extending through the apertures and affixed to the stable surface, the mounting plate being pivotable relative to the stable surface by the fasteners sliding along the elongated apertures;
a pair of springs attached to the mounting plate and attached to the stable surface, the springs limiting the amount of pivotal movement of the mounting plate; and
a rotary chuck capable of clamping a variety of sizes of workpieces and comprising
a clamp assembly including a plate, a plurality of jaws attached to the plate and movable relative to the plate, the jaws being positionable in a variety of positions relative to the plate to accommodate a variety of sizes of workpieces, the jaws capable of clamping an associated workpiece, the clamp assembly defining a centerline,
a frame coupled with the plate, the frame and the plate being rotationally fixed relative to each other,
a first drive mechanism capable of operating the clamp assembly, the first drive mechanism being affixed to the frame,
a second drive mechanism affixed to the frame and to the mounting plate, the second drive mechanism rotating the frame, the clamp assembly and the first drive mechanism around the centerline relative to a ground surface.

14. The assembly of claim 13, wherein the springs extend parallel to the stable surface.

15. The assembly of claim 13, wherein the first drive mechanism, the clamp assembly and the frame can be rotated around 360 degrees.

16. The assembly of claim 13, wherein the first drive mechanism includes a motor, and further comprising a microprocessor operating the motor.

17. The assembly of claim 13, further comprising a microprocessor operating the first and second drive mechanisms.

18. The assembly of claim 13, wherein the first drive mechanism includes a motor, a threaded drive rod connected to the motor, and a threaded drive coupling coupling the drive rod to the clamp assembly.

19. The assembly of claim 13, further including a stop plate mounted on the frame, wherein the stop plate is configured to abut a workpiece and prevent further movement of the workpiece relative to the second drive mechanism.

* * * * *